(12) United States Patent
Zocca et al.

(10) Patent No.: US 6,260,764 B1
(45) Date of Patent: Jul. 17, 2001

(54) METHOD OF DETECTING A BAR CODE ON A SCAN LINE, AND AN APPARATUS FOR DETECTING AND DECODING A BAR CODE

(75) Inventors: Rinaldo Zocca; Matteo Calzolari, both of Bologna (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/217,830

(22) Filed: Dec. 22, 1998

(30) Foreign Application Priority Data

Dec. 24, 1997 (EP) .................................................. 97830715

(51) Int. Cl.[7] .............................. G06K 7/10; G06K 9/22; G06K 19/06; G06K 26/10
(52) U.S. Cl. ............................... 235/462.25; 235/462.26; 235/462.16
(58) Field of Search ................... 235/467.16, 467.25, 235/467.26, 454

(56) References Cited

U.S. PATENT DOCUMENTS

| 5,389,770 | 2/1995 | Ackley . |
| 5,481,097 | 1/1996 | Tafoya . |
| 5,925,868 | * 6/1999 | Arends et al. ........................ 235/454 |
| 5,969,325 | * 10/1999 | Hecht et al. ..................... 235/462.16 |

FOREIGN PATENT DOCUMENTS 0 795 836A    9/1997  (EP) .

OTHER PUBLICATIONS

"Multiple Processor System for Candidate Selection and Decoding", IBM Technical Disclosure Bulletin, vol. 34, No. 2, Jul. 1, 1991, pp. 32–34.

* cited by examiner

*Primary Examiner*—Karl D. Frech
(74) *Attorney, Agent, or Firm*—Sughrue, Mion, Zinn, Macpeak & Seas, PLLC (57) ABSTRACT

The detecting method described is conceived for use in a bar code decoding system based on digital processing of signals. it functions to process in real time a signal from an A/D converter and determined the portions of this signal which contain a likely bar code and rejecting the portions that surely do not contain a code. Only the former are signaled to a subsequent decoding process. The method steps are essentially the following: determining local maxima and minima of the digitalized analog signal; determining valid transitions; calculating the side of constant brightness zones located between two successive valid transitions; determining likely codes; if appropriate, repositioning the code starting zone; and if appropriate, analyzing detected potential codes for congruence, and signaling the likely codes.

31 Claims, 8 Drawing Sheets

METHOD OF DETECTING A BAR CODE ON A SCAN LINE, AND AN APPARATUS FOR DETECTING AND DECODING A BAR CODE

BACKGROUND OF THE INVENTION

This invention relates to a method of detecting a bar code on a scan line, and to an apparatus for detecting and decoding a bar code.

A particular problem in plants for handling and sorting objects is that of quickly and univocally identifying the objects such that subsequent allotting operations can be speeded up and optimized.

In these plants, the objects to be identified are usually laid onto a feeding plane (e.g., a belt conveyor), and automatically identified by means of decoding bar codes carried on the objects themselves. The continuous movement of the feeding plane will take each object to a scan area, whereat a bar code scanner is provided which, once turned on, illuminates the code to be decoded along a read line (scan line); light scattered from spots on said line is picked up by a light-sensing element to generate an analog electric signal which is proportional to the intensity of the scattered light.

The analog signal thus generated is then processed in a digitalizer block, which will sample the signal to extract numerical features that are thoroughly representative of the signal, thereby to define a scan of the code on the object under examination.

This scan is processed through a bar code decoding program, to ultimately issue the sequence of the decoded characters of the bar code.

In conventional decoding processes, the laser beam continually sweeps across the scan area in a succession of linear scans. However, only a few of these scans are actually acquired and processed. In fact, scans "useful" to identify the object are only those effected along lines which cross the bar code. The acquisition and processing of all the code scans would slow down the decoding process and, therefore, be incompatible with the requirement for a high speed of response (a requirement due to that the objects only pass in the scan area for a short time).

In conventional decoding processes, the number of scans actually acquired and processed is far larger than that strictly necessary for reading the bar codes on the objects to be identified (the "useful" scans). In addition, once a scan is acquired, the scanner tries to decode the optical signal relating to all the samples of the scan line, regardless of whether they do or do not belong to bar code zones. All this is time consuming and cost intensive on account of the considerable storage and computing resources involved.

Thus, a need exists in this field for methods which be effective to detect the position of a likely bar code within a scan line. In this respect, the prior art method can be split into two basic categories:

methods based on analog circuits;

methods based on the digital processing of two-dimensional optical images.

While essentially achieving their objectives, either methods have, however, certain drawbacks.

The methods based on analog circuits do not lend themselves to use in a digital signal processing system like that employed for decoding bar codes. The methods based on two-dimensional image processing, on the other hand, require full acquisition of the entire two-dimensional image before processing can be initiated, and are thus very slow and expensive with regard to computing and storage resources.

SUMMARY OF THE INVENTION

The underlying technical problem of this invention is to enable a bar code to be detected on a scan line by a digital image processing method which is on the whole fast, reliable, and involves substantially less computing and storage resources (and hence, lower costs) than the aforementioned prior methods.

According to a first aspect, this invention provides a method of detecting a bar code on a scan line, comprising the following steps:

a) acquiring an analog electric signal representing variations in light intensity along a scan line;

b) sampling the analog signal for a predetermined number K of sampling intervals, so as to extract, for each interval, a sample $x_k$ identified by a pair of values $(Px_k, Lx_k)$ representing the position and light intensity of a point of the sampling range in the scan line;

and being characterized in that it further comprises the following step:

c) each time comparing each of the samples $x_k$ extracted to the following samples $x_{k+h}$, thereby to detect a plurality of zones of substantially constant brightness, said plurality of zones comprising, in succession, a broad initial zone, a plurality of narrow intermediate zones, and a broad final zone.

Throughout this description and the appended claims, the term "bar code" is used to indicate an optical code, also two-dimensional or colored, comprising, along at least one read direction (corresponding to the laser beam path during the scanning sweep), a succession of alternately black and white zones exhibiting sufficient relative light contrast (for simplicity, only traditional bar codes will be considered wherein these zones are defined as bar and space elements).

The terms "broad" and "narrow" should be intended in a relative sense. Broad is a zone which extends, along the read direction, with a width larger than four times the width of the smallest element in the code (module). Narrow is instead a zone which extends with a width smaller than four times the module width.

The above method allows the sampled signal to be processed in real time such that its portions can be detected which have features marking them as likely optical images of a bar code. Detecting these portions on the scan line allows then to identify a succession of zones having sufficiently sharp relative contrast (black and white areas), showing a certain uniformity in the ratio between their dimensions (succession of narrow zones), and being preceded and followed by relatively much broader zones of uniform brightness (also called quiet zones). Any zones which do not show the above features surely do not belong to a bar code, and are therefore rejected for the purpose of the subsequent decoding operations.

Unlike the prior art methods described above, in the method of this invention, the scan is processed as the samples are being made available from the previous operations; accordingly, this method is uniquely fast and simple to implement, since it does not require that the input signal be stored, nor the whole scan acquired, before it can proceed with the processing.

In addition, this being a digital method, it can be implemented using digital hardware or software in a microprocessor, thereby obviating the need for dedicated analog circuits.

Hardware implementation is also cost favorable on account of the required small storage capacity, while software implementation ensures uniquely fast processing because of the small number of operations to be carried out per sample.

The alternating black and white zones of the code produce alternating local maxima and minima of the analog signal, and the transitions between white and black zones of the code are represented by transitions of the signal between maxima and minima, and vice versa. Thus, the search for a potential bar code on the scan line can suitably be carried out as a search for such local maxima and minima. Preferably, therefore, step c) comprises the following steps:

c1) finding, among samples $x_k$, those samples $xm_i$ which represent local maximum and minimum points, or local peaks, of the sampled signal;

c2) defining zones $Dz_j$ corresponding to the samples $xm_i$ found, and calculating the size of these zones;

c3) comparing the size of two successive zones $Dz_j$ and $Dz_{j+1}$ to find out the aforesaid plurality of zones.

In this way, the number of samples for a later decoding attempt can be drastically reduced. In fact, only scan portions as have been identified in the above operations will be indicated as potential codes to the decoding process to follow which will definitively establish whether or not they are code zones and will decode them. In this case, the decoding process, which is much more burdensome from the computational standpoint, can be applied to a smaller amount of data, thereby improving the overall process performance as regards speed of response.

The search for the maximum and minimum points is carried out in a simple, fast and systematic way as the samples are being acquired. Preferably, step c1) comprises the following substep:

each time comparing each sample $x_k$ to a predetermined number of successive samples, to check if the sample $x_k$ under consideration is representative of a local maximum (minimum) point of the sampled signal, and if so, classifying sample $x_k$ as a maximum (minimum) point and searching for a successive minimum (maximum) point, but if not so, continuing the search for a maximum (minimum) point.

Even more preferably, step c1) further comprises the following substeps:

c11) selecting a number NTH of comparative samples from the K samples found during the sampling;

c12) comparing samples $x_k$ and $x_{k+h}$, where k=1 and h=1, to check if sample $x_k$ is larger (smaller) than sample $x_{k+h}$; and c121) if so, iteratively repeating step c12) for h=h+1, until h=NTH; and thereafter, c1211) classifying sample $x_k$ as a maximum (minimum) point $xm_i$;

c1212) repeating step c12) for k=k+h in searching for a minimum (maximum) point, until k+h=K;

c122) if not so, iteratively repeating step c12) for k=k+h until k+h=K.

This search operation, therefore, also includes a filtering operation effective to eliminate all those points which, while being potentially classifiable as local maximum and minimum points of the signal, are not representative of the bar code elements, but merely due to noise, e.g. of the electronic type.

As said before, the transitions between white and black zones of the code (that is, between bar and space elements) are represented by signal transitions from a maximum to a minimum, and vice versa. Thus, as the local maximum and minimum points are being found, these transition points can be detected to define the elements of the code found. Advantageously, step c2) comprises the following substeps:

c21) each time finding a transition point $t_j$ between two successive peaks xmi, and between the scan start and the first peak xmi and the scan end and the last peak $xm_i$;

c22) calculating the difference of $Pt_j$ and $Pt_{j+1}$ positions of two successive transition points $t_j$ and $t_{j+1}$, and taking this difference as the size of zone $Dz_j$.

Throughout this description and the appended claims, scan start and end respectively mean the starting and ending points of the analog signal sampling. These points may, in the particular example discussed hereinafter, be points on the scan line which correspond to the terminating points (along the direction of the scan line) of the object feeding plane.

For a thus detected zone to be actually representative of a bar or space in the bar code, it must have sufficiently sharp light contrast versus adjacent zones. Preferably, step c21) comprises the following substeps:

c211) each time comparing the values of light intensity difference between two successive peaks $xm_i$ and $xm_{i+1}$ with a reference value, to check if this difference is larger than the reference value and:

c2111) if so, classifying as the transition point $t_j$ a point located at position $Pt_j$, between the positions $Pmx_i$ and $Pmx_{i+1}$, of the two peaks $xm_i$ and $xm_{i+1}$ under consideration, updating j=j+1, and repeating step c211) for i=i+1 until the value of i+1 equals the number of peaks $xm_i$ found;

c2112) if not so, repeating step c211) for i=i+1 until the value of i+1 equals the number of peaks $xm_i$ found. Even more preferably, the classified transition point $t_j$ occupies a position $Pt_j$, located midway between positions $Pmx_i$ and $Pmx_{i+1}$ of the two peaks $xm_i$ and $xm_{i+1}$1 considered.

The above steps allow to distinguish, as they are being found, zones which are actually representative of bar code elements from those representing noise contributions of varying importance according to the operating conditions of the specific application (e.g., reading surface roughness, high background brightness, etc.).

In an advantageous embodiment of the inventive method, the aforementioned reference value is a predetermined value.

In a preferred alternative embodiment of this method, the reference value is a variable value calculated as a function of the brightness of the brightest of two peaks $xm_i$ and $xm_{i+1}$.

Alternatively, the reference value may be a variable value calculated as a function of both the brightness of the brightest of the two peaks $xm_i$ and $xm_{i+1}$, and the position of the transition point considered.

Thus, an acceptable contrast value can be determined independently, transition by transition, e.g. as a varying value with the background level of brightness. This allows selection criteria of the detected zones to be established which are highly detailed and flexible, thereby making the inventive method quite robust to signal noise and capable of correctly working with both strong input signals (when the code locates at the proximal end of the reading range, for example) and weak input signals (when the code locates at the distal end of the reading range).

Preferably, the step of finding the plurality of zones that are representative of the bar code comprises an initial substep of searching for the broad initial zone of the code, followed by a substep of searching for the narrow intermediate zones and the broad final zone of the code. In particular, step c3) comprises the following substeps:

c31) establishing a state of search for the initial zone of a code Cm, starting from a condition of m=0;

c32) comparing zones $Dz_j$ and $Dz_{j+1}$, where j=1, to check if zone $Dz_j$ is larger than a predetermined multiple of zone $Dz_{j+1}$; and if so:
   c321a) classifying zone $Dz_j$ as the initial zone of code Cm;
   c322a) classifying zone $Dz_{j+1}$ as first element of code Cm;
   c323a) recording the size of zone $Dz_{j+1}$ as the size of the smallest element (MINBARW) of code Cm;
   c324a) establishing a state of search for the intermediate zones of code Cm until the final zone of code Cm is found;
if not so:
   c321b) repeating the steps from c32) onward, for j=j+1, to search for the initial zone of the code, until the value of j equals the number of transition points found plus 1.

Thus, where the scan line under examination intersects a bar code, the latter can be readily detected by finding its broad initial zone (initial quiet zone).

Preferably, step c32) further comprises a substep of checking if the size of zone $Dz_{j+1}$ is smaller than a value (MAXBARW) representing the largest acceptable size for a code element.

This allows absurd cases to be rejected wherein the zones classified as code elements have dimensions which are plainly too large for acceptation.

Even more preferably, step c324a) comprises the substep of checking if the size of zone $Dz_j$ is larger than a predetermined multiple of the size of the smallest element being found up to that time (MINBARW), and:
if so:
   c324a1a) classifying zone $Dz_j$ as the final zone of code Cm;
   c324a2a) classifying zone $Dz_{j-1}$ as the last element of code Cm;
   c324a3a) signaling, to a subsequent decoding process, the code Cm identified and a packet of detect information associated therewith;
   c324a4a) searching for the initial zone of a new potential code Cm+1 by repeating the steps from c32) onward, with j=j+1;
if not so:
   c324a1b) if $Dz_j$ is smaller than the size of the smallest element found up to that time (MINBARW), updating this value by taking MINBARW=$Dz_j$;
   c324a2b repeating the steps from c324a) onward, until the value of j equals the number of transition points found plus 1.

In this way, the potential code initially identified by finding its broad initial zone, is accurately located on the scan line by finding the successive narrow intermediate zones (code elements) and broad final zone.

The method of this invention, as described in the foregoing, is advantageously effective with high or low resolution codes as well as at different reading distances, because recognition of the code zones (broad initial and final zones and narrow intermediate zones) is obtained by successive comparisons of the size of the adjacent zones as they are being found, not by actually measuring their size (which may vary considerably in absolute terms as the reading distance and the code size change).

Preferably, step c324a) further comprises a substep of checking if the ratio of zone $Dz_j$ size to the size of the smallest (MINBARW) of the code elements found up to that time is greater than a configuring parameter of the method (QZRATIO), calculated as the minimum ratio of the size of the code initial zone to the smallest size element (module), or if zone $Dx_j$ is larger than the value MAXBARW.

The last-mentioned check allows absurd cases to be rejected wherein the ratio of $Dz_j$ to MINIBARW does not qualify $Dz_j$ as the final zone of the code, but $Dz_j$ is plainly too large a size for qualification as a code element.

Even more preferably, the comparison of $Dz_{j+1}$ and $Dz_j$ in step c32) is carried out by checking if the ratio of $Dz_j$ to $Dz_{j+1}$ is greater than a configuring parameter of the method calculated as the ratio of QZRATIO to a further configuring parameter of the method (LEVEL) selected according to the code types to be detected.

The introduction of such configuring parameters of the method in the above checking procedures allows the method to be optimized for its intended applications. These parameters are programmed consistent with the types of bar code symbols to be detected.

In a particularly advantageous embodiment, the method of this invention further comprises a step of re-positioning the initial zone of a identified code Cm prior to signaling the code to the decoding process. This allows a possible limitation of the in-line process, due to that the condition for detecting the code start may lead to inaccurate detection of same, to be overcome. Since the procedure for finding the broad initial zone is provided no information as to the size of the minimum code element, as is made instead available in determining the broad final zone, this procedure may turn out to be inaccurate in certain circumstances, in the sense of regarding as initial a much broader zone of the code than the true initial zone.

Preferably, the re-positioning step comprises the following substeps:
checking if the ratio of the dimension $Dz_j$ of the last element of the code Cm identified to the smallest element in the code (MINBARW) is greater than the configuring parameter QZRATIO, and:
if so, classifying $Dz_j$ as true initial zone of the code, and $Dz_{j+1}$ as first true element of the code;
if not so, repeating the comparison for the preceding zone until the first element of the code is arrived at; and thereafter
classifying as the true initial zone and first true element of the code those one classified to be such during the previous steps, respectively.

Once the width of the smallest code element is known, a backward analysis of the identified elements will enable, without any overburden in computational load or storage capacity, proper positioning of the broad initial zone of the code, and hence an exact determination of the zone of the scan line where the identified bar code locates.

Preferably, the method of this invention further comprises a step of testing the identified code for congruence, before signaling said code to the decoding process.

Even more preferably, the congruence tests include the steps of:
selecting, from the detect information packet associated with the identified code, the code configuring parameters;
and at least one of the following steps
rejecting the identified code if it contains a smaller (larger) number of intermediate zones than a minimum (maximum) limiting number defined as a configuring parameter of the method; this enables scan zones containing isolated diagramical elements (and very long scan zones containing an image of a script) to be rejected;
rejecting the identified code if the code size in modules, calculated as the ratio of the code size to the size of the smallest element, is below (above) a limiting minimum (maximum) value defined as a configuring parameter of the method;

rejecting the identified code if the mean size, also in modules, of each intermediate zone, calculated as the ratio of the mean size of an intermediate code zone to the size of the smallest element, is below (above) a minimum (maximum) limiting value defined as a configuring parameter of the method;

rejecting the identified code if the size of the smallest code element exceeds an upper limiting value defined as a configuring parameter of the method.

Only the potential codes which may have passed these tests will be signaled to the subsequent decoding process as being likely codes.

According to a second aspect, the invention relates to an apparatus for detecting and decoding a bar code, comprising:

a means of acquiring in real time an analog electric signal which is proportional to variations of light intensity along a scan line;

a means of converting the analog electric signal to a digital signal;

a means of processing the digital signal to decode the bar code;

characterized in that it further comprises a means of determining the bar code position on the scan line, said means being adapted to only signal, to a subsequent decoding process, scan portions which have been identified as bar codes.

Thus, the above scanner is designed for use in a bar code decoding process based on digital signal processing. The scanner can process the analog signal in real time and identify those portions of the signal which contain a likely bar code, and can reject all those portions which positively contain no such codes. Only the former portions will then be signaled to a subsequent decoding process.

BRIEF DESCRIPTION OF THE DRAWINGS

Further features and advantages of this invention will be apparent from the following detailed description of a preferred embodiment thereof, given with reference to the accompanying drawings. In the drawings.

DETAILED DESCRIPTION OF THE INVENTION

Figure 1:
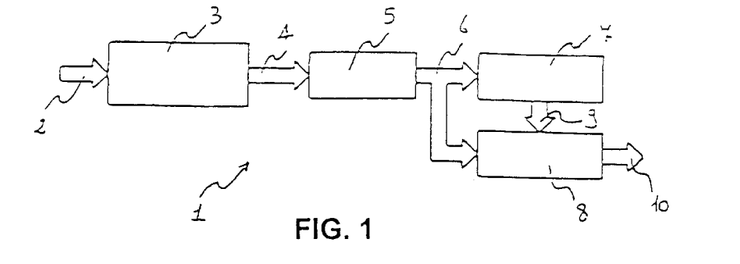
FIG. 1 is a block diagram of an apparatus for detecting and decoding a bar code, according to this invention.

Shown at 1 in FIG. 1 is an apparatus for detecting and decoding a bar code on an object along a scan line. In particular, the apparatus 1 corresponds to a receiver assembly adapted to acquire and process an optical signal 2 from an illuminated spatial region.

In a typical but not exclusive application, the apparatus 1 is intended for installation within a scanner for decoding a bar code. The scanner is placed above (or alongside) a supporting plane movable along a feeding direction and having objects carrying the bar codes to be read laid thereon. The scanner is provided with a laser beam arranged to sweep across a scan plane which intersects the supporting plane along a scan line. This line periodically intersects the objects (and their codes) moving on the supporting plane.

The apparatus 1 comprises, located at an inlet end thereof, an opto-electronic assembly 3 for acquiring and processing the optical signal 2 issuing from the illuminated scan line. The assembly 3 is adapted to generate an analog electric signal 4 which is proportional to light intensity variations of the points on the illuminated scan line, and is connected in series with an A/D converter 5 adapted to convert the analog signal 4 to a digital signal 6 after sampling. The A/D converter 5 is connected in series with a detector assembly 7 adapted to determine the position of a potential bar code on the scan line being considered, and with a decoder assembly 8, itself connected to the detector assembly 7, which is adapted, based on information 9 supplied by the latter about the presence of a likely bar code, to output a succession of characters 10 identifying the decoded code.

Figure 2:
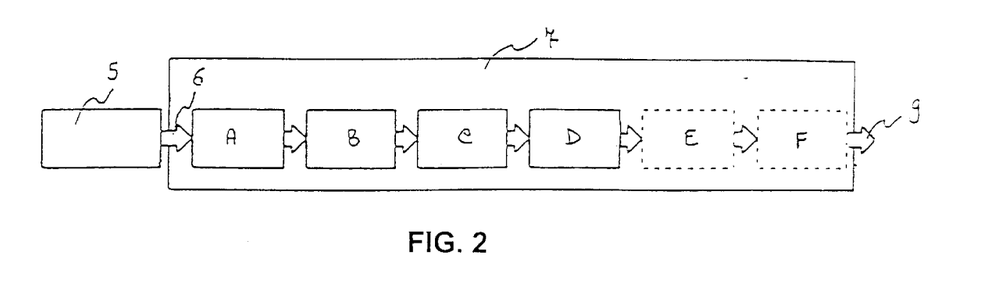
FIG. 2 is a block diagram of the main steps of a detecting method carried out by the apparatus of FIG. 1.

FIG. 2 shows a set of functional blocks which represent the main steps carried out by the detector assembly 7 in determining the position of a potential bar code on the illuminated scan line. These steps are basically the following:

A) determining the local maxima and minima of the digitalized analog signal;

B) determining valid transitions;

C) calculating the size of constant brightness zones located between two successive valid transitions;

D) determining likely codes;

E) if appropriate, re-positioning the code starting zone;

F) if appropriate, analyzing detected potential codes for congruence, and signaling likely codes.

These steps will be discussed in further detail hereinafter.

Assume, for convenience of explanation, of acquiring a scan of the object which relates to a scan line that intersects the bar code on the object, and subsequently carrying out conventional processing and converting steps (using the assembly 3 and converter 4, respectively). In particular, consider sampling the analog signal 4 for a predetermined number K of sampling intervals to extract, for each interval, a sample $x_k$ identified by a pair of values ($Px_k$, $Lx_k$) which respectively represent the position and the light intensity of a point in the sampling range on the scan line.

As the samples $x_k$ are being made available from the sampling step, they are analyzed for a searching sequence of zones having such features as to be reasonably qualified as zones of a likely bar code. In particular, successive samples are compared to look for a sequence of alternating black and white zones (likely elements of the code) which would have sufficiently sharp contrast with one another, show a certain uniformity in the ratio between their dimensions, and are preceded and followed by relatively much broader zones of uniform brightness (quiet zones).

Since the alternating black and white zones of the code show up on the scan line as alternating local maxima and minima of the analog signal, the search for a potential bar code on the scan line will include, as its initial step, a step of looking for such local maximum and minimum points (also referred to as "peaks" hereinafter). The search for peaks may be carried out using any of a variety of suitable procedures; a procedure will be described herein below which is specially advantageous on account of its simplicity and speed of execution.

Figure 3:
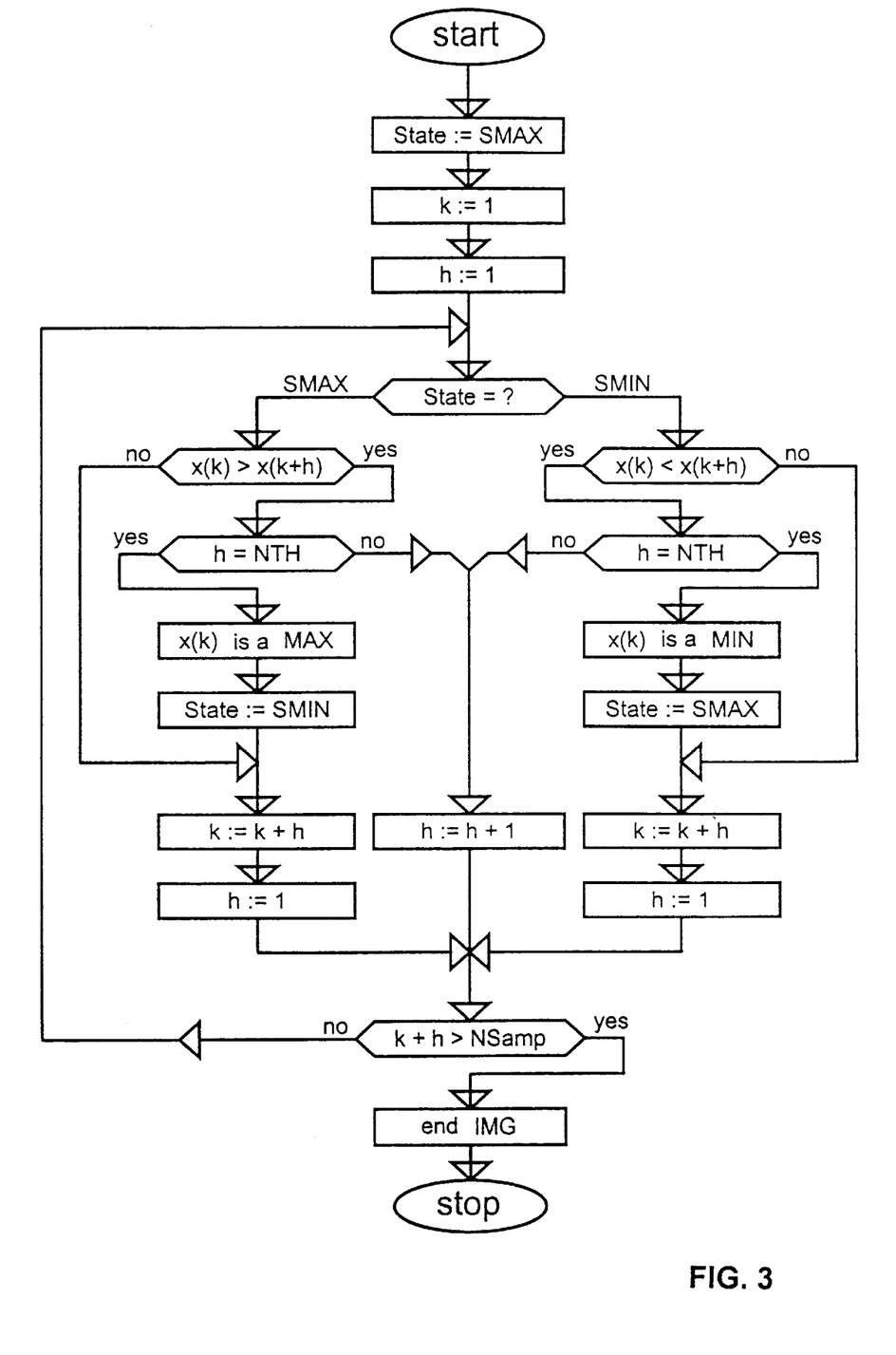
FIG. 3 is a flow diagram of a first sequence of the detecting method of FIG. 2.

This procedure consists, as shown in FIG. 3, of sequentially surveying the succession $x_k$ of samples, starting with the first and ending with the last, each time comparing each sample to a predetermined number NTH (forming a configuring parameter of the method, selected according to the specific applications) of successive samples to determine samples $xm_i$ which represent potential local maximum (or minimum) points or local peaks of the sampled signal.

In this case, the procedure is run through two operational states: a state SMAX whereby the maximum points are searched, and a state SMIN whereby the minimum points are searched.

The procedure starts with scrolling through the succession of samples $x_k$, conveniently starting in the search state SMAX, regardless of the value of the first sample (a decision to start in the state SMIN would be equally acceptable). In the search state SMAX, the current sample $x_k$ is iteratively compared to successive NTH samples to check if $x_k$ is indeed greater than all of the following NTH samples, that is to check that the following relation holds:

$$x(k)>x(k+h) \forall h \in (1, NTH) \quad [1.a]$$

If relation [1.a] is met by all these comparisons, $x_k$ is then classified to be a maximum point, the operational state is switched to SMIN, the sample at position k+NTH is taken to be the current sample, and a minimum point is searched until k+h=K, where K is the predetermined number of sampling intervals and, accordingly, the total number of samples $x_k$ considered.

If relation [1.a] is not met, i.e. if for a given $h \in (1, NTH)$ it is:

$$x(k) \leq x(k+h) \quad [1.b]$$

$x_k$ is then rejected, the sample at position k+h is taken to be the current sample, the operational state is unchanged, and the search for a maximum is continued by iteratively repeating the comparison of relation [1.a] until k+h=K.

Likewise, in the search state SMIN, the current sample $x_k$ is iteratively compared to the next NTH samples to check if $x_k$ is indeed smaller than all of the following NTH samples, that is to check that the following relation holds:

$$x(k)<x(k+h) \forall h \in (1, NTH) \quad [1.c]$$

If relation [1.c] is met by all of the above comparisons, $x_k$ is classified to be a minimum point, the operational state is changed to SMAX, the sample at position k+NTH is taken as the current sample, and a maximum point is sought until k+h=K.

If relation [1.c] is not met, i.e. if for a given $h \in (1, NTH)$ it is:

$$x(k) \geq x(k+h) \quad [1.d]$$

then $x_k$ is rejected, the sample at position k+h is taken as the current sample, the operational state is unchanged, and the search for a minimum is continued by iteratively repeating the comparison of relation [1.c] until k+h=K.

Once a sample $x_k$ is classified to be $xm_i$ (i.e. a sample representing a peak of the sampled signal), the value of the index k is determined to be the position $Pmx_i$ of the peak found, and the value of $x_k$ is determined to be the width $Lmx_i$.

This step of finding the peaks of the sampled signal allows a filtering operation to be carried out (in the event of NTH being greater than 1) to remove all those points which, while being potentially classifiable as local signal maximum and minimum points, are not representing of the bar code elements, but are merely noise factors, such as electronic noise.

Figure 4:
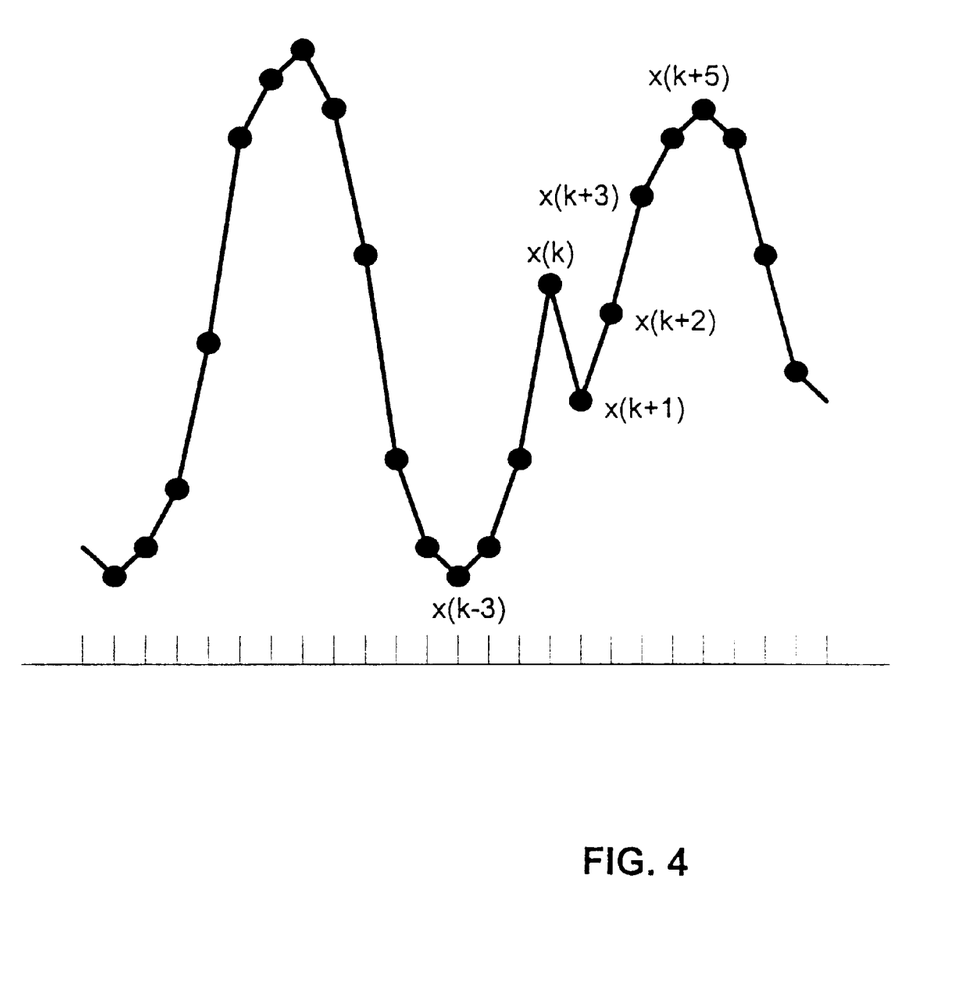
FIG. 4 is an exemplary diagram of another sequence added to the step of FIG. 3.

FIG. 4 shows in this respect an exemplary diagram of said filtering operation. In the figure, the abscissas are the positions of the sampling intervals, with the origin (position 0) at the beginning of the scan start, and the ordinates are the brightness values (width) of the sampled points (the positions are measured with time intervals). It can be seen that, for example, with NTH=3, point $x_k$, being a potential maximum point, is rejected because it does not meet condition [1.a], whereas points $x_{k-3}$ and $x_{k+5}$ are classified as actual minimum and maximum.

Figure 5:
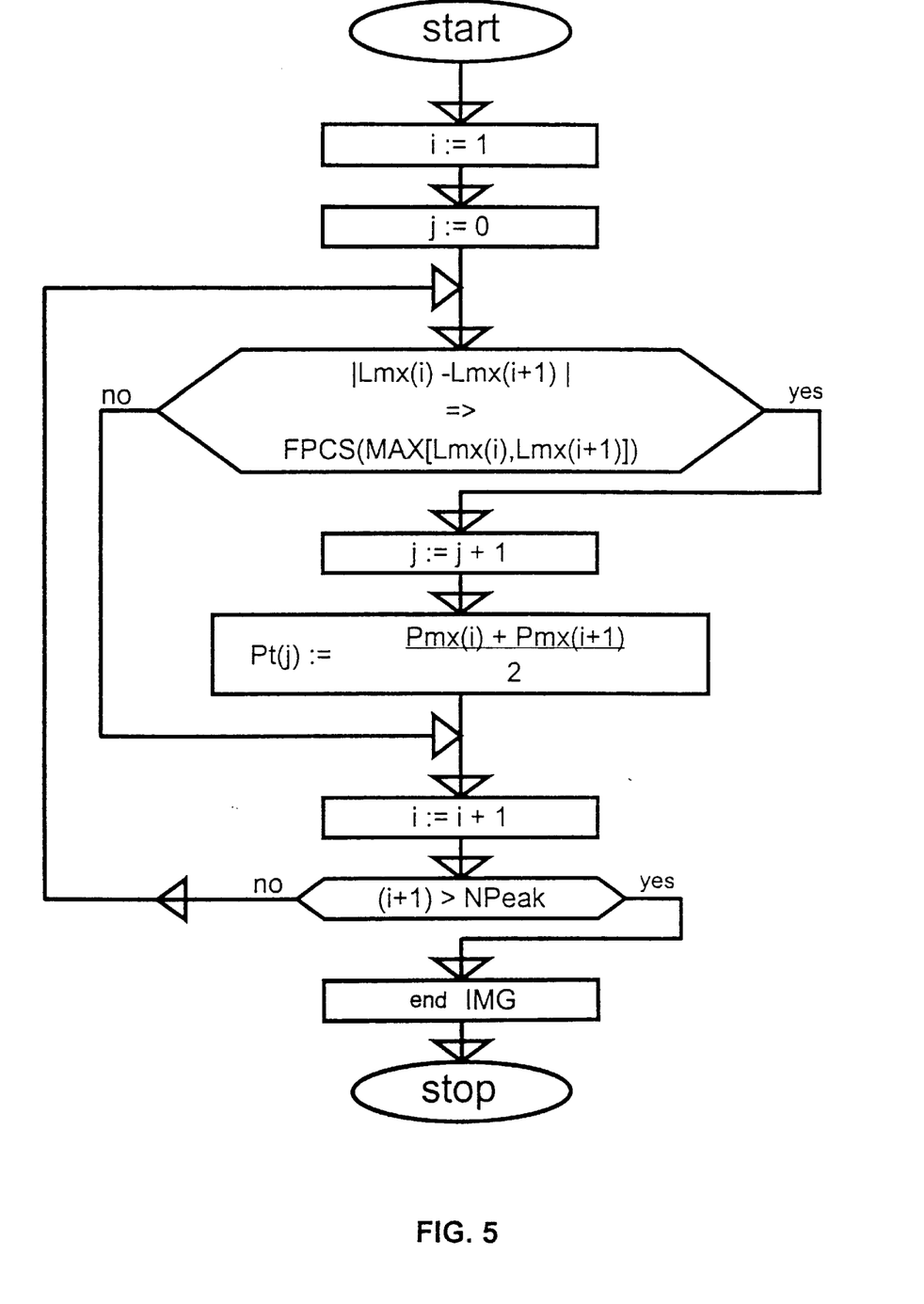
FIG. 5 is a flow diagram of a second sequence of the detecting method of FIG. 2.

As the peaks $xm_i$ are being found and classified, the valid transitions are identified by going through the succession of width values $Lmx_i$ (brightness) of the various peaks $xm_i$, from the first one to the last one as shown in FIG. 5.

A transition is defined as a shift from one level of brightness to another. Accordingly, each pair of consecutive maximum and minimum points, respectively representing consecutive white and black zones, identify one transition $t_j$. Likewise, a transition $t_j$ is identified between the scan start point and the first peak, and between the last peak and the scan end point.

Each transition $t_j$ is characterized by a contrast $Vt_j$ given as:

$$Vt_j = \frac{Lmax_i - Lmin_i}{Lmax_i}$$

where $Lmax_i$ and $Lmin_i$ are the maximum and minimum brightness levels, respectively, which are delimiting a transition $t_j$.

Only those transitions which show sufficiently high contrast, in particular above a given reference parameter, are regarded to be valid.

In a first embodiment of the inventive method, said parameter is a predetermined value. Alternatively, the parameter may be a value, varying between transitions, of a FPCS (Printed Contrast Signal Function) constituting a configuring parameter of the method. Particularly in a second most advantageous embodiment, the FPCS function is defined as the minimum acceptable variation according to the brightness of the brightest of the two peaks $xm_i$ and $xm_{i+1}$ under consideration (FPCS($Lmax_i$)). In a third embodiment, the reference parameter is instead a value which varies between transitions according to both the brightness of the brightest of the two peaks $xm_i$ and $xm_{i+1}$ considered and the position of the transition point considered (FPCS($Lmax_i, Pt_j$)).

Figure 7:
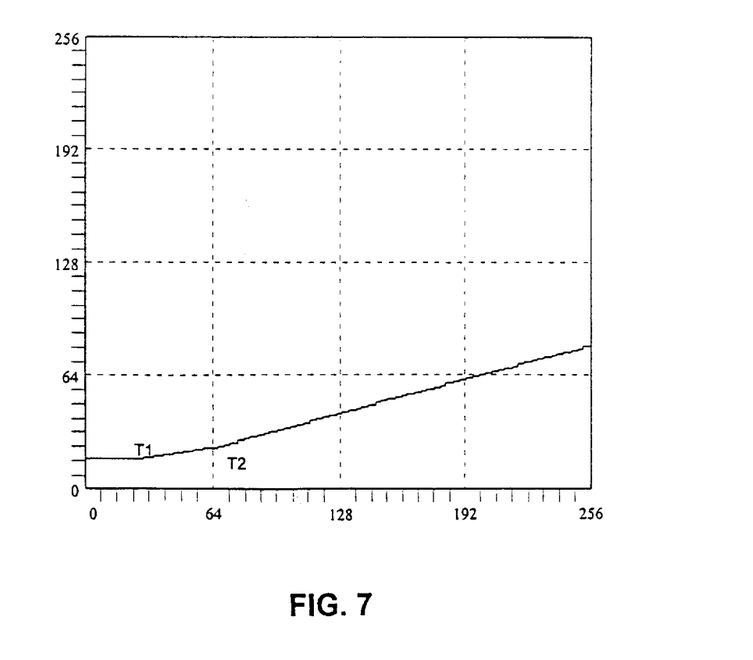
FIG. 7 is a diagram of another embodiment of the sequence of FIG. 5.

The FPCS function is programmed according to the specific operating conditions, such as the background brightness of the scan under examination or of the material on which the code is printed. FIG. 7 shows a programming example to be discussed further in this specification.

Once the FPCS function is selected, for each pair of consecutive maximum and minimum points, the transition delimited thereby is recognized as valid if:

$$|Lmx_i - Lmx_{i+1}| \geq FPCS(MAX[Lmx_i, Lmx_{i+1}]) = FPCS(Lmax_i)$$

When this condition is verified, the point at position $Pt_j$ located at midway between positions $Pmx_i$ and $Pmx_{i+1}$ of the two peaks $xm_i$ and $xm_{i+1}$ considered is classified to be the transition point $t_j$, and the next transitions $t_{j+1}$ are similarly searched, starting with peak $xm_{i+1}$ and updating the value of i, until the value of i+1 equals the number of peaks $xm_i$ found.

If the check fails, the comparison is repeated on the next peaks $xm_i$, looking for transition point $t_j$ without updating the value of j.

Figure 6:
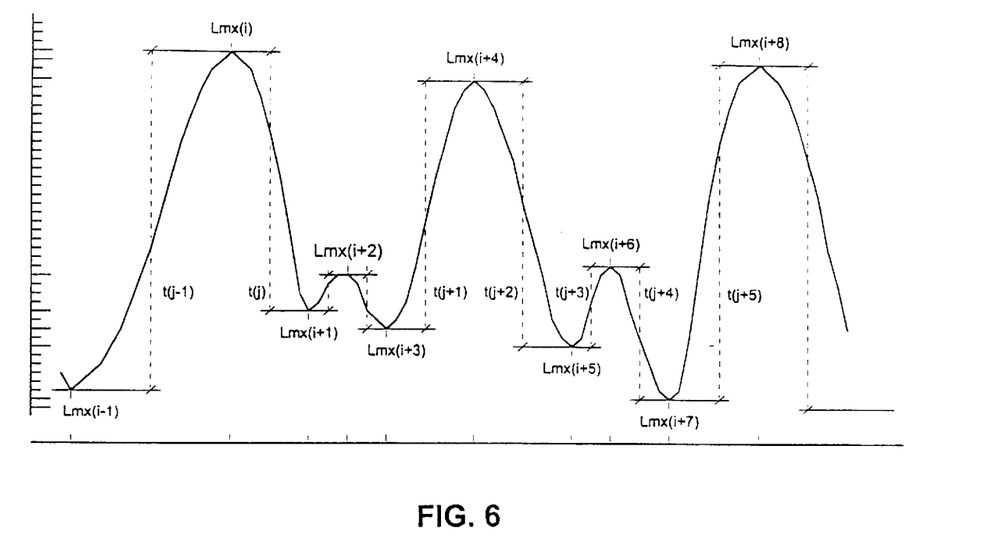
FIG. 6 is an exemplary diagram of a first embodiment of the sequence of FIG. 5.

FIG. 6 is an exemplary diagram of the step of searching for the valid transitions described above. In particular, it can be seen that, assuming $FPCS(Lmx_{i+2})=6$, for example, the transitions lying between peaks $Lmx_{i+1}$, $Lmx_{i+2}$ and $Lmx_{i+3}$ would be rejected. All the other transitions would instead be accepted as valid transitions.

Each pair of successive valid transitions identifies a zone $Dz_j$ of constant brightness whose size equals the difference of positions. $Pt_j$ of two successive valid transitions. Constant brightness zones (respectively first and last) are also regarded to be the scan zones which lie between the scan start and the first transition, and between the last transition and the scan end. The computation of such first and last zone sizes is performed assuming the presence of two dummy transitions, located respectively at the scan start and end.

Figure 8:
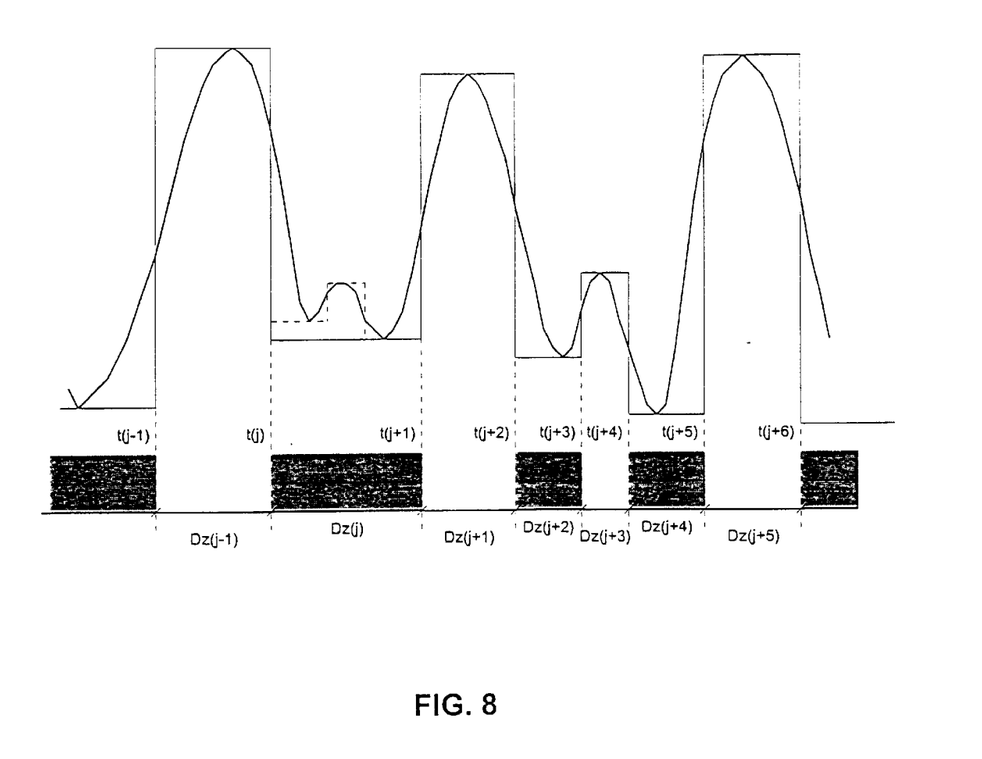
FIG. 8 is an exemplary diagram of a third sequence of the detecting method of FIG. 2.

FIG. 8 shows, by way of example, a succession of constant brightness zones identified by the above steps. It should be noted that, at zone $Dz_j$, the rejected transitions do not delimit a respective zone, but are incorporated to the zone delimited by their adjacent valid transitions.

The method of this invention goes on with an analysis of the scan zones each time determined, to see if they can be classified as zones of a potential bar code. In particular, the sequence of scan zones is surveyed in succession from the first one to the last one to identify groups of consecutive zones which are characterized by a size ratio below a determined value by a selected program parameter and are delimited by broader zones (quiet zones).

For the purpose, the method of this invention provides two operational states, namely:

a state SNOCODE whereby the start of a potential code is sought by examining the zones in pairs, to check if any one zone exists which is sufficiently larger than its next one to be taken as the broad initial zone of the potential code (initial quiet zone);

a state SCODE whereby, once a broad initial zone is found, the following zones are examined to check if any one exists which is sufficiently large, compared to the narrowest of the code elements recognized up to that time, to be taken as the broad final zone of the potential code (final quiet zone).

Figure 9:
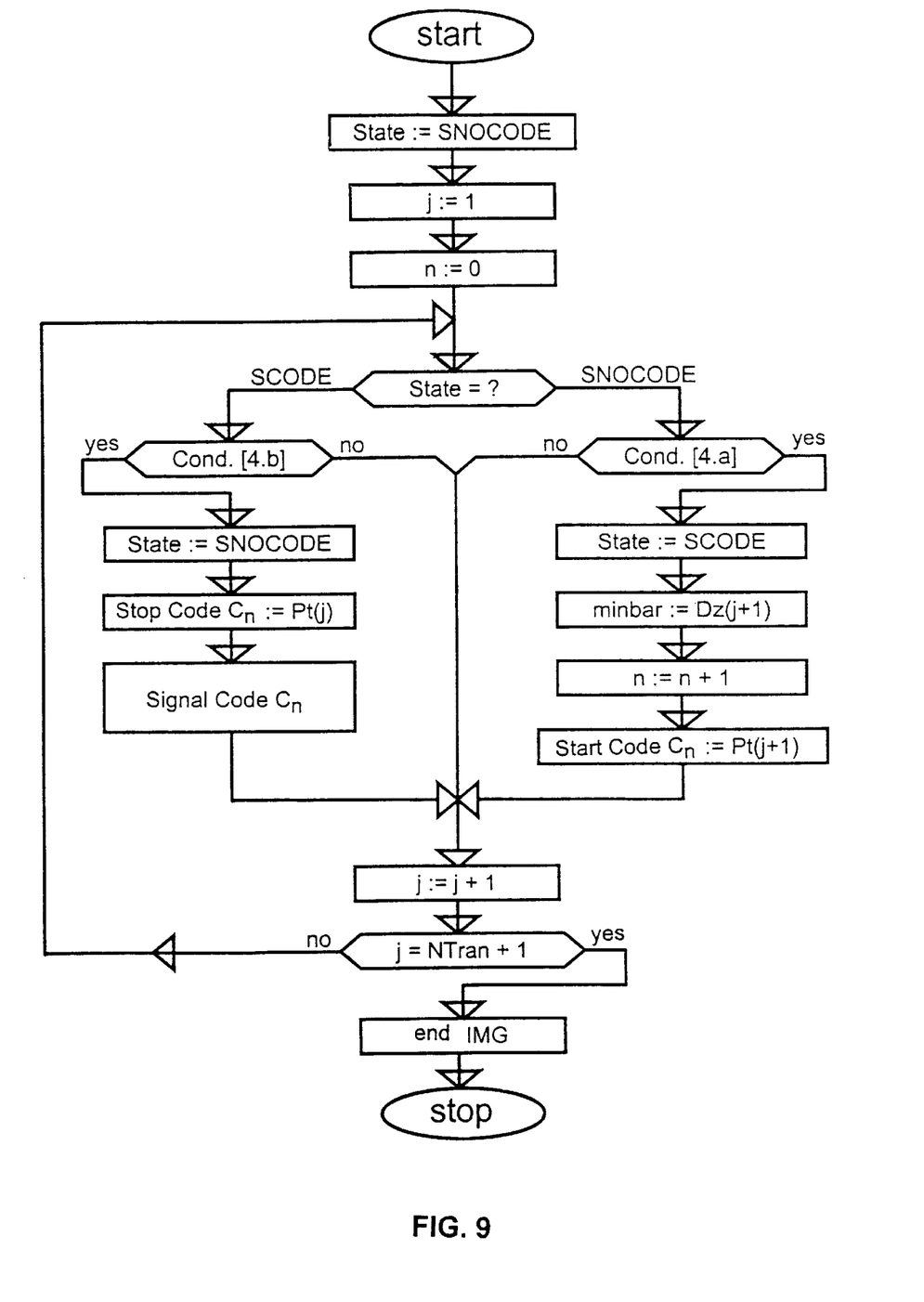
FIG. 9 is a flow diagram of a fourth sequence of the detecting method of FIG. 2.

The step of determining a potential code starts, as shown in FIG. 9, with a search for the broad initial zone, that is in the state SNOCODE. In this operational state, the dimensions of two consecutive zones $Dz_j$ and $Dz_{j+1}$ are compared iteratively to check if zone $Dz_j$ is larger than a predetermined multiple of the next zone $Dz_{j+1}$; concurrently therewith, it is checked if zone $Dz_{j+1}$ under consideration is smaller than a factor (MAXBARW), which factor is a method configuring parameter and represents the largest acceptable size (in number of samples) for a code element.

If both checks are favorable, zone $Dz_j$ is classified as the initial zone of a first potential code $C_1$ on the scan line under examination, zone $Dz_{j+1}$ is classified as the first element of code $C_1$, the size of zone $Dz_{j+1}$ is recorded as the size of the smallest element (MINBARW) of code $C_1$, and the operational state SCODE is switched to continue surveying through the succession of zones $Dz_1$ and look for the broad final zone of code $C_1$. If at least one of the above checks is unfavorable, the succession of zones $Dz_j$ continues to be surveyed searching for the broad initial zone until the dummy transition point located at the scan end is reached.

The object of the second of the above mentioned checks is to reject absurd cases wherein zones classified as code elements have dimensions which are plainly too large to be classified as such.

In a particularly advantageous embodiment of the inventive method, the aforementioned multiple is computed according to the ratio between two configuring parameters (referenced QZRATIO and LEVEL) of the method.

This parameter QZRATIO represents the minimum ratio of the size of the initial code zone to the size of the smallest element in the code (module).

The parameter LEVEL is a parameter that should be programmed according to the types of bar code symbols to be detected, and takes account of that the parameter QZRATIO does not, strictly speaking, regard the code module, but rather the first code element to appear after the initial zone, which element generally is a multiple in size of the module.

In the operational state SCODE, on the other hand, the succession of zones $Dz_j$ is surveyed to each time check whether the size of a zone $Dz_j$ considered exceeds a predetermined multiple of the smallest element determined up to that point (MINBARW), or exceeds the parameter MAX-PARW. In particular, the value of the parameter QZRATIO is selected as the multiple.

If at least one of the above checks is favorable, zone $Dz_j$ is classified as final zone of the code $C_1$, zone $Dz_{j-1}$ is classified as last element in the code $C_1$, the code $C_1$ thus identified is signaled to the subsequent decoding process as a potential bar code, the state SNOCODE is switched, and the operation continued similar as above in searching for any further code $C_2$ along the same scan line. If at least one of the above checks is unfavorable, the following zone $Dz_{j+1}$ is iteratively considered, to search for the code final zone until the last dummy transition is reached, after updating, at each iteration, the value MINBARW with the value $Dz_j$, if the latter happens to be smaller than the former.

The object of the second of the above mentioned checks is to reject absurd cases wherein the ratio of $Dz_j$ to MIN-BARW is not such that $Dz_j$ can be classified as final zone of the code, but $Dz_j$ is plainly too large to be taken as an element of the code.

Associated with each potential code detected is a positional information packet containing an indication of the code initial position (Startcode), the code final position (Stopcode), the number of elements that make up the code (Burstcode), and the size of the narrowest element (MINBARW). The code initial position is defined as that of the transition separating the broad initial zone from the first code element, and the final position is defined as that of the transition separating the last code element from the broad final zone.

Once a potential code is identified, the code start can be repositioned by a backtracking operation, using the information about the size of the narrowest element; this information has, in fact, become available from the moment when the broad final zone of the potential code was found.

Figure 11:
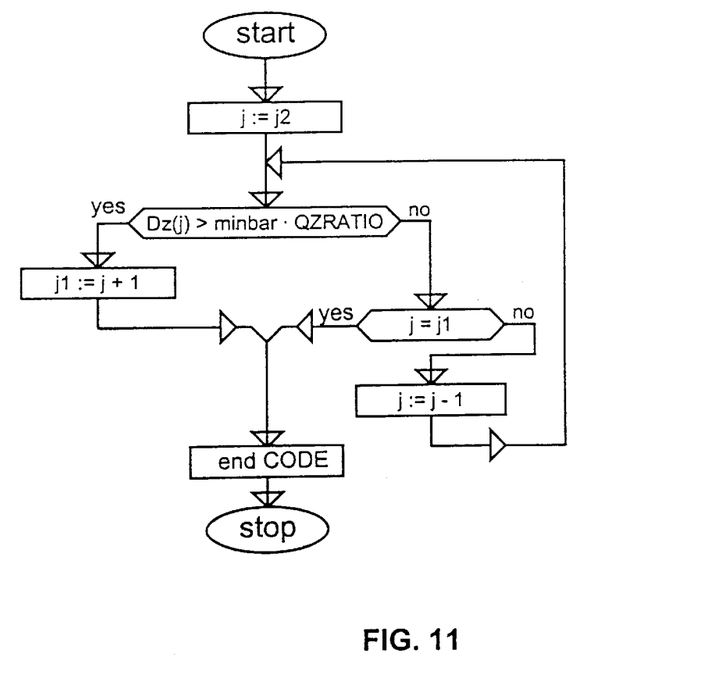
FIG. 11 is a flow diagram of the exemplary sequence of FIG. 10.

As shown in FIG. 11, the backtracking operation consists of a backward analysis of the succession of code zones, from the last code element to the first one, searching for zone $Dz_j$ that would satisfy the following condition:

$$Dz_j > QZRATIO \cdot MINBARW$$

The zone $Dz_j$ that satisfies the above condition is classified as the true initial zone of the potential code identified, while the zone $Dz_{j+1}$ is classified as the first true element of the code. On the other hand, if none of the elements of the potential code meet the above condition, as the true initial zone and first true element of the code will be taken the initial zone and first element classified to be such during the steps preceding the backtracking.

The need to perform the backtracking operation is actually dictated by the capability of the subsequent decoding process to accept or reject the presence of an initial zone which is quite a broad one compared to the true initial quiet zone. In view of that several algorithms offer this feature, the backtracking process is optional, and if performed, would merely result in a broader scan zone than is strictly necessary being passed on to the decoding process.

Figure 10:
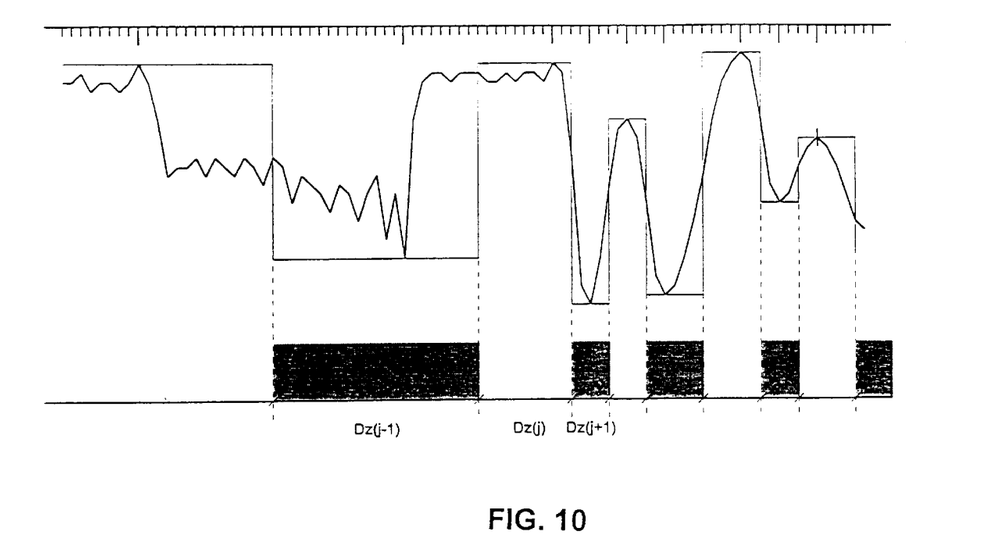
FIG. 10 is an exemplary diagram of a fifth sequence of the detecting method of FIG. 2.

FIG. 10 is an exemplary diagram of the repositioning step described above. The zone $Dz_j$, which is the true initial quiet zone, does satisfy the conditions for determination of the initial quiet zone when compared with the next zone $Dz_{j+1}$; and these conditions are also met by zone $Dz_{j-1}$, when compared with zone $Dz_j$. Without the backtracking algorithm, it would be taken as the initial quiet zone the zone $Dz_{j-1}$; by applying the backtracking algorithm, the initial quiet zone is instead shifted to the zone $Dz_j$ (in the example, it was assumed n=4, QZRATIO=8 and LEVEL=4).

Once the potential codes are identified, the method of this invention allows a series of congruence tests to be carried out for the purpose of rejecting those potential codes which, although gone through the previous steps, have unacceptable features for qualification as true codes (e.g., because sequences are either too short or too long).

Only a few of the congruence tests to be carried out on the potential codes detected will be described herein below. It should be appreciated that, based upon combinations of the available information about these codes, many more tests may be contemplated, all directed to restrict the number of potential codes to be signaled to the decoding process.

By such congruence tests, a potential code would be rejected when:

the code contains a smaller (or larger) number of elements (burstcode) than a lower (or upper) limit defined as a configuring parameter of the method;

the code size, expressed in modules, computed as the ratio of the code size to the size of the smallest element, is smaller (or larger) than a lower (or upper) limit defined as a configuring parameter of the method;

the mean size, expressed in modules, of the elements, when computed as the ratio of the mean size of a code element to the size of the smallest element, is smaller (or larger) than a lower (or upper) limit defined as a configuring parameter of the method;

the size of the smallest element in the code exceeds an upper limit defined as a configuring parameter of the method.

Only the potential codes that pass such tests are actually signaled to the subsequent decoding process as likely codes.

Since these tests are only aimed at minimizing the number of likely codes signaled to the decoding process, the method of this invention will perform well even if only a few (perhaps none) of them are carried out; in this case, there will merely be a larger number of potential codes being signaled to the decoding process.

Example of Programming the Fpcs Function

FIG. 7 shows a diagram of an example of the programming of the FPCS function in a typical application. Marked on the diagram abscissa axis is the brightness Lmaxi of white elements, and on the ordinate axis the comparative value for brightness variation.

This diagram takes account of that, if the signal is sufficiently strong ($Lmax_i>T_2$), the transition should have a higher contrast than a predetermined value (e.g., 30% of the brightness maximum). In programming FPCS, this translates into a straight line having an angular coefficient equal to the required contrast. If the signal drops below a minimum level ($Lmax_i<T_1$), no transition will be accepted as a valid one, so that variations positively due to noise will not be considered. Within the segment where $Lmax_i$ lies between $T_1$ and $T_2$, the situation changes progressively from that of point $T_1$, where the variation is only considered to be valid if it has 100% contrast, to that of point $T_2$, where the variation is considered to be valid if its contrast exceeds a predetermined value (e.g., 30%).

An exemplary application where the above programming criteria are specially effective, is the reading of codes printed on white or matt paper. The paper roughness causes signal oscillations which, when the reading is effected at a close distance, may have the same amplitudes as the transitions produced by elements of a code being read from afar. On the other hand, the background brightness, in the instance of close-up reading, would be high, and less so from greater distances. The above criteria, by relating the amplitudes of the signal variations to the background brightness, allow transitions due to surface roughness to be rejected, which would be unobtainable by using a predetermined comparison parameter in place of the FPCS function.

Another case where the above criteria are effective is that of bar code reading using CCD contact devices with non-uniform illumination along the scan. By suitably defining the profile of the FPCS function, it then becomes possible to correct for the effects of the code illumination profile.

The FPCS function also may be programmed for different profiles, so as to match different operating situations and the different requirements enforced thereby, e.g. the need to read codes with a weak contrast, or codes having good printing contrast but a noisy environment, such as the presence of corrugated board can produce, etc.

The method of this invention, as described hereinabove, affords a number of advantages, among which are the following:

being a digital method, it can be implemented by digital hardware or software in a microprocessor, thereby avoiding the need for analog-digital circuits;

it requires no storing of the input signal, and no subsequent processing thereof, and can be implemented in line as new samples are being made available; this feature makes it simple to implement either in software form (which would be specially fast thanks to the limited number of operations per sample to be performed) or hardware form (which would be specially simple and economical by virtue of the small amount of memory involved);

thanks to the use of the programmable contrast function, it is specially robust to the presence of signal noise, and can also operate satisfactorily with both strong input signals (such as when the code locates at the proximal end of the read range) and weak input signals (when the code locates at the distal end of the read range);

can operate satisfactorily with high or low resolution codes and at different reading distances, because the identification of the code zones is based on the ratio between successive zones rather than on a measurement of their actual size (which may vary considerably in absolute terms according to reading distance and the code size);

thanks to the backtracking procedure, the method provides specially accurate determinations without overburdening the computation or storage facilities;

it is robust to signal blurring, in the sense that it can detect both correctly focused codes and codes out of focus, down to disappearance of the narrow element modulations.

What is claimed is:

1. A method of detecting a bar code on a scan line, comprising the following steps:
    a) acquiring an analog electric signal representing variations in light intensity along a scan line;
    b) sampling the analog signal for a predetermined number K of sampling intervals, so as to extract, for each interval, a sample $x_k$ identified by a pair of values ($Px_k$, $Lx_k$) representing the position and light intensity of a point of the sampling interval in the scan line; and
    c) each time comparing each of the samples $x_k$ extracted to the following samples $x_{k+h}$, thereby to detect a plurality of zones of substantially constant brightness, said plurality of zones comprising, in succession, a broad initial zone, a plurality of narrow intermediate zones, and a broad final zone;
    wherein step c) comprises the following steps:
    c1) finding, among samples $x_k$, those samples $xm_I$ which represent local maximum and minimum points, or local peaks, of the sampled signal;
    c2) defining zones $Dz_j$ corresponding to the samples $xm_I$ found, and calculating the size of these zones;
    c3) comparing the sizes of two successive zones $D_{zj}$ and $Dz_{j+1}$ to find out the aforesaid plurality of zones; and
    wherein step c1) comprises the following substeps:
    each time comparing each sample $x_k$ with a predetermined number of successive samples, to check if the sample $x_k$ under consideration is representative of a local maximum (minimum) point of the sampled signal, and if so, classifying sample $x_k$ as a maximum (minimum) point and searching for a successive minimum (maximum) point, but if not so, continuing the search for a maximum (minimum) point;
    c11) selecting a number NTH of comparative samples from the K samples found during the sampling;
    c12) comparing samples $x_k$ and $x_{k+h}$, where k=1 and h=1, to check if sample $x_k$ is larger (smaller) than sample $x_{k+h}$;
    c121) if so, iteratively repeating step c12) for h–h+1, until h=NTH; and thereafter,
    c1211) classifying sample $x_k$ as a maxim um (minimum) point $xm_I$;
    c1212) repeating step c2) for k=k+h in searching for a minimum (maximum) point, until k+h=K; and
    c122) if not so, iteratively repeating step c12) for k=k+h until k+h=K.

2. A method according to claim 1, wherein NTH is 1.

3. A method according to claim 1, wherein step c2) comprises the following substeps:
    c21) each time finding a transition point $t_j$ between two successive peaks $xm_i$, and between the scan start and the first peak $xm_i$ and the scan end and the last peak $xm_i$;
    c22) calculating the difference of $Pt_j$ and $Pt_{j+1}$ positions of two successive transition points $t_j$ and $t_{j+1}$, and taking this difference as the size of zone $Dz_j$.

4. A method according to claim 1, wherein step c21) comprises the following substeps:
    c211) each time comparing the value of light intensity difference between two successive peaks $xm_i$ and $xm_{i+1}$ with a reference value, to check if this difference is larger than the reference value; and:
    c2111) if so, classifying as transition point $t_j$ a point located at position $Pt_j$, between the positions $Pmx_i$ and $Pmx_{i+1}$ of the two peaks $xm_i$ and $xm_{i+1}$ under consideration, updating j=j+1, and repeating step c211) for i=i+1 until the value of i+1 equals the number of peaks $xm_i$ found;
    c2112) if not so, repeating step c211) for i=i+1 until the value of i+1 equals the number of peaks $xm_i$ found.

5. A method according to claim 4, wherein the classified transition point $t_j$ occupies a position $Pt_j$ located midway between the positions $Pmx_i$ and $Pmx_{i+1}$ of the two peaks $xm_i$ and $xm_{i+1}$ considered.

6. A method according to claim 4, wherein the reference value is a predetermined value.

7. A method according to claim 4, wherein the reference value is calculated as a function of the brightness of the brightest of the two peaks $xm_i$ and $xm_{i+1}$.

8. A method according to claim 4, wherein the reference value is a value calculated as a function of both the brightness of the brightest of the two peaks $xm_i$ and $xm_{i+1}$, and function of the position of the transition point considered.

9. A method of detecting a bar code on a scan line, comprising the following steps:
    a) acquiring an analog electric signal representing variations in light intensity along a scan line;
    b) sampling the analog signal for a predetermined number K of sampling intervals, so as to extract, for each interval, a sample $x_k$ identified by a pair of values ($Px_k$, $Lx_k$) representing the position and light intensity of a point of the sampling interval in the scan line; and
    c) each time comparing each of the samples $x_k$ extracted to the following samples $x_{k+h}$, thereby to detect a plurality of zones of substantially constant brightness, said plurality of zones comprising, in succession, a broad initial zone, a plurality of narrow intermediate zones, and a broad final zone;
    wherein step c) comprises the following steps:
    c1) finding, among samples $x_k$, those samples $xm_I$ which represent local maximum and minimum points, or local peaks, of the sampled signal;
    c2) defining zones $Dz_j$ corresponding to the samples $xm_j$ found, and calculating the size of these zones;
    c3) comparing the sizes of two successive zones $D_{zj}$ and $Dz_{j+1}$ to find out the aforesaid plurality of zones;
    wherein step c3) comprises the following steps:
    c31) establishing a state of search for the initial zone of a code Cm, starting from a condition of m=0;
    c32) comparing zones $Dz_j$ and $Dz_{j+1}$, where j=1, to check if zone $Dz_j$ is larger than a predetermined multiple of zone $Dz_{j+1}$; and:
    if so:
    c321a) classifying zone $Dz_j$ as the initial zone of code Cm; C323a) recording the size of zone $Dz_{j+1}$ as the size of the smallest element (MINBARW) of code Cm;
    c324a) establishing a state of search for the intermediate zones of code Cm until the final zone of code Cm is found;
    if not so:
    c312b) repeating the steps from c32) onward, for j=j+1, to search for the initial zone of the code, until the value of j equals the number of transition points found plus 1.

10. A method according to claim 9, wherein step c32) further includes a substep of checking if the size of zone $Dz_{j+1}$ is smaller than a value (MAXBARW) representing the largest acceptable size for a code element.

11. A method according to claim 9, wherein step c324a) comprises a substep of checking if the size of zone $Dz_j$ is larger than a predetermined multiple of the size of the smallest element being found up to that time (MINBARW), and:

if so:
c324a1a) classifying zone $Dz_j$ as the final zone of code Cm;
c324a2a) classifying zone $Dz_{j-1}$ as the last element of code Cm;
c324a3a) signaling, to a subsequent decoding process, the code Cm identified and a packet of detect information associated therewith;
c324a4a) searching for the initial zone of a possible new code Cm+1 by repeating the steps from c32) onward, with j=j+1;

if not so:
c324a1b) if $Dz_j$ is smaller than the size of the smallest element being found up to that time (MINBARW), updating this value by taking MINBARW=$Dz_j$;
c324a2b) repeating the steps from c324a) onward until the value of j equals the number of transition points found plus 1.

12. A method according to claim 9, wherein step c324a) further comprises a substep of checking if the ratio of zone $Dz_j$ size to the size of the smallest (MINBARW) of the code elements found up to that time is greater than a configuring parameter of the method (QZRATIO), calculated as the minimum ratio of the size of the code initial zone to the smallest size element (module), or if zone $Dz_j$ is larger than a value MAXBARW representing the largest acceptable size for a code element.

13. A method according to claim 12 wherein the comparison of $Dz_{j+1}$ and $Dz_j$ in step c32) is carried out by checking if the ratio of $Dz_j$ to $Dz_{j+1}$ is greater than a configuring parameter of the method calculated as the ratio of QZRATIO to a further configuring parameter of the method (LEVEL) selected according to the code types to be detected.

14. A method according to claim 9, further comprising a step of re-positioning the initial zone of the identified code Cm prior to signaling the code to the decoding process.

15. A method according to claim 14, wherein the repositioning step comprises the following substeps:

checking if the ratio of the dimension $Dz_j$ of the last element of the code Cm identified to the smallest element in the code (MINBARW) is greater than the configuring parameter QZRATIO, and:
if so, classifying $Dz_j$ as true initial zone of the code, and $Dz_{j+1}$ as first true element of the code;
if not so, repeating the comparison for the preceding zone until the first element of the code is arrived at; and thereafter:
classifying as the true initial zone and first true element of the code those one classified to be such during the previous steps respectively.

16. A method according to claim 9, further comprising a step of testing the identified code for congruence before signaling said code to the decoding process.

17. A method according to claim 16, wherein the congruence tests comprises the step of:
selecting, from the detect information packet associated with the identified code, the code configuring parameters; and at least one of the following steps:
rejecting the identified code if it contains a smaller (larger) number of intermediate zones than a minimum (maximum) limiting number defined as a configuring parameter of the method;
rejecting the identified code if the code size in modules, calculated as the ratio of the code size to the size of the smallest element, is below (above) a limiting minimum (maximum) value defined as a configuring parameter of the method;
rejecting the identified code if the mean size, also in modules, of each intermediate zone, calculated as the ratio of the mean size of an intermediate code zone to the size of the smallest element, is below (above) a minimum (maximum) limiting value defined as a configuring parameter of the method;
rejecting the identified code if the size of the smallest code element exceeds an upper limiting value defined as a configuring parameter of the method.

18. A method of locating a bar code on a scan line, comprising the following steps:
a) acquiring an analog electric signal representing variations in light intensity along a scan line;
b) sampling the analog signal for a predetermined number K of sampling intervals, so as to extract, for each interval, a sample $x_k$ identified by a pair of values ($Px_k$, $Lx_k$) representing the position and light intensity of a point of the sampling interval in the scan line;
c1) finding, among samples $x_k$, those samples $sm_I$ which represent local maximum and minimum points, or local peaks, of the sampled signal;
c1bis) comparing the values of light intensity of two successive local peaks to locate a plurality of zones comprising, in succession, an initial area of substantially constant light intensity, a central area of alternating light intensity and a final area of substantially constant light intensity.

19. A method according to claim 18, wherein step c1bis) comprises the following steps:
c2) defining zones $Dz_j$ corresponding to the samples $xm_j$ found, and calculating the size of these zones;
c3) comparing the sizes of two successive zones $Dz_j$ and $Dz_{j+1}$.

20. A method according to claim 19, wherein step c2) comprises the following substeps:
c21) each time finding a transition point $t_j$ between two successive peaks $xm_I$, and between the scan start and the first peak $xm_I$ and the scan end and the last peak $xm_I$;
c22) calculating the difference of $Pt_j$ and $Pt_{j+1}$ positions of two successive transition points $t_j$ and $t_{j+1}$, and taking this difference as the size of zone $Dz_j$.

21. A method according to claim 20, wherein step c21) comprises the following substeps:
c211) each time comparing the value of light intensity difference between two successive peaks $xm_I$ and $xm_{I+1}$ with a reference value, to check if this difference is larger than the reference value; and:
c2111) if so, classifying as transition point $t_j$ a point located at position $Pt_j$, between the positions $Pmx_I$ and $Pmx_{I+1}$ of the two peaks $xm_I$ and $xm_{I+1}$ under consideration, updating j=j+1, and repeating step c211) for I=I+1 until the value of i+1 equals the number of peaks $xm_I$ found;
c2112) if not so, repeating step c211) for I=I+1 until the value of I+1 equals the number of peaks $xm_I$ found.

22. A method according to claim 21, wherein the classified transition point $t_j$ occupies a position $Pt_j$ located midway between the positions $Pmx_I$ and $Pmx_{I+1}$ of the two peaks $xm_I$ and $xm_{I+1}$ considered.

23. A method according to claim 21, wherein the reference value is a predetermined value.

24. A method according to claim 21, wherein the reference value is calculated as a function of the brightness of the brightest of the two peaks $xm_I$ and $xm_{I+1}$.

25. A method according to claim 21, wherein the reference value is a value calculated as a function of both the brightness of the brightest of the two peaks $xm_I$ and $xm_{I+1}$, and function of the position of the transition point considered.

26. A method according to claim 18, wherein the-step c1) of finding those samples $xm_I$ which represent local maximum and minimum points is carried out by comparing each of the samples $x_k$ extracted to at least one other sample $x_{k+h}$.

27. A method according to claim 26, wherein step c1) comprises the following substep:

each time comparing each sample $x_k$ with a predetermined number of successive samples, to check if the sample $x_k$ under consideration is representative of a local maximum (minimum) point of the sampled signal, and if so, classifying sample $x_k$ as a maximum (minimum) point and searching for a successive minimum (maximum) point, but if not so, continuing the search for a maximum (minimum) point.

28. A method according to claim 27, wherein step c1) further comprises the following substeps:.

c11) selecting a number NTH of comparative samples from the K samples found during the sampling;

c12) comparing samples $x_k$ and $x_{k+h}$, where k=1 and h=1, to check if sample $x_k$ is larger (smaller) than sample $x_{k+h}$; and c121) if so, iteratively repeating step c12) for h=h+1, until h=NTH; and thereafter, c1212) repeating step c12) for k=k+h in searching for a minimum (maximum) point, until k+h=K;

c122) if not so, iteratively repeating step c12) for k=k+h until k+h=K.

29. An apparatus for locating and decoding a bar code, comprising:

a means for acquiring in real time an analog electric signal which is proportional to variations of light intensity along a scan line;

a means for sampling the analog electric signal at predetermined number K of sampling points so as to extract, for each point, a sample $x_k$ and for converting the analog electric signal to a digital signal;

a means for processing the digital signal to decode the bar code; and a determining means adapted to only signal, to said processing means, scan portions which have been identified as potential bar codes, wherein said determining means comprises:

a means for fining, among samples $x_k$, those samples $x_{mi}$ which represent local maximum and minimum points, or local peaks of the sampled signal;

a means for comparing the values of light intensity of two successive local peaks to locate a plurality of zones comprising, in succession, an initial zone of substantially constant light intensity, a central zone of alternating light intensity and a final zone of substantially constant light intensity.

30. An apparatus according to claim 29, wherein the means for comparing the values of light intensity of two successive local peaks comprises:

means for defining zones $Dz_j$ corresponding to the samples $xm_I$ found, and calculating the size of these zones;

means for comparing the sizes of two successive zones $Dz_j$ and $Dz_{j+1}$.

31. An apparatus according to claim wherein 29, the means for finding those samples $xm_I$ which represent local maximum and minimum points compare each of the samples $x_k$ extracted to at least one other sample $x_{k+h}$.

* * * * *